(12) United States Patent
Pan et al.

(10) Patent No.: US 8,869,109 B2
(45) Date of Patent: Oct. 21, 2014

(54) DISASSEMBLING AN EXECUTABLE BINARY

(75) Inventors: Aimin Pan, Beijing (CN); Kaimin Zhang, Hefei (CN); Bin Zhu, Edina, MN (US)

(73) Assignee: Microsoft Corporation, Redmond, WA (US)

( * ) Notice: Subject to any disclaimer, the term of this patent is extended or adjusted under 35 U.S.C. 154(b) by 1766 days.

(21) Appl. No.: 12/050,159

(22) Filed: Mar. 17, 2008

(65) Prior Publication Data

US 2009/0235054 A1 Sep. 17, 2009

(51) Int. Cl.
  *G06F 9/44* (2006.01)
  *G06F 9/45* (2006.01)
  *G06F 11/00* (2006.01)

(52) U.S. Cl.
  CPC .................................. *G06F 8/53* (2013.01)
  USPC ........... 717/124; 717/126; 717/128; 717/154; 717/159; 714/39

(58) Field of Classification Search
  CPC ........................................................ G06F 8/53
  See application file for complete search history.

(56) References Cited

U.S. PATENT DOCUMENTS

| | | | | |
|---|---|---|---|---|
| 5,307,492 A | * | 4/1994 | Benson | 717/159 |
| 5,410,648 A | * | 4/1995 | Pazel | 717/124 |
| 5,450,575 A | * | 9/1995 | Sites | 717/128 |
| 5,854,924 A | * | 12/1998 | Rickel et al. | 717/132 |
| 5,946,484 A | * | 8/1999 | Brandes | 717/136 |
| 5,978,586 A | * | 11/1999 | Baisley et al. | 717/158 |
| 6,014,513 A | * | 1/2000 | Voelker et al. | 717/131 |
| 6,292,934 B1 | | 9/2001 | Davidson et al. | |
| 6,393,606 B1 | * | 5/2002 | Davila et al. | 717/127 |
| 6,886,156 B2 | * | 4/2005 | McCormack | 717/136 |
| 7,036,116 B2 | | 4/2006 | Haber et al. | |
| 7,065,652 B1 | | 6/2006 | Xu et al. | |
| 7,137,110 B1 | * | 11/2006 | Reese et al. | 717/158 |
| 7,140,005 B2 | * | 11/2006 | Maliszewski | 717/126 |
| 7,178,132 B2 | | 2/2007 | Pierce | |
| 7,246,267 B2 | * | 7/2007 | Bennett et al. | 714/39 |
| 7,296,261 B2 | * | 11/2007 | Witchel et al. | 717/136 |
| 7,493,597 B2 | * | 2/2009 | Hefner | 717/124 |
| 7,873,952 B2 | * | 1/2011 | Shtilman et al. | 717/154 |

(Continued)

FOREIGN PATENT DOCUMENTS

WO  9001738 A1  2/1990

OTHER PUBLICATIONS

Laune C. Harris et al. "Practical Analysis of Stripped Binary Code" [Online], Published 2005, pp. 1-6, [Retrieved on Dec. 22, 2011], [Retrieved from Internet], <http://128.105.2.28/par-distr-sys/papers/Harris05WBIA.pdf>.*

(Continued)

*Primary Examiner* — Thuy Dao
*Assistant Examiner* — Ziaul A Chowdhury
(74) *Attorney, Agent, or Firm* — Dan Choi; Judy Yee; Micky Minhas

(57) ABSTRACT

A method for disassembling an executable binary (binary). In one implementation, a plurality of potential address references may be identified based on the binary and a plurality of storage addresses containing the binary. A plurality of assembler source code instructions (instructions) may be generated by disassembling the binary. The binary may be disassembled at one or more sequential addresses starting at each of the plurality of potential address references.

20 Claims, 7 Drawing Sheets

(56) References Cited

U.S. PATENT DOCUMENTS

| | | | |
|---|---|---|---|
| 7,950,003 B1* | 5/2011 | Duca et al. | 717/124 |
| 8,117,600 B1* | 2/2012 | Roeck et al. | 717/128 |
| 8,117,660 B2* | 2/2012 | Pan et al. | 726/25 |
| 8,407,675 B1* | 3/2013 | Clark | 717/131 |
| 8,739,127 B2* | 5/2014 | Bates | 717/124 |
| 2002/0040470 A1* | 4/2002 | Guthrie et al. | 717/126 |
| 2003/0065976 A1* | 4/2003 | Bennett et al. | 714/35 |
| 2003/0088860 A1* | 5/2003 | Wang | 717/153 |
| 2004/0019884 A1* | 1/2004 | Haber et al. | 717/154 |
| 2005/0177736 A1 | 8/2005 | de los Santos et al. | |
| 2005/0198526 A1 | 9/2005 | Marr et al. | |
| 2006/0253687 A1 | 11/2006 | Jakubowski et al. | |
| 2007/0089171 A1* | 4/2007 | Aharon et al. | 726/22 |
| 2007/0094644 A1* | 4/2007 | Nardini et al. | 717/128 |
| 2007/0180440 A1* | 8/2007 | Pechanek | 717/159 |
| 2008/0010538 A1* | 1/2008 | Satish et al. | 714/38 |
| 2008/0022405 A1* | 1/2008 | Wang et al. | 726/23 |
| 2008/0250018 A1* | 10/2008 | Geffner et al. | 707/6 |
| 2009/0328185 A1* | 12/2009 | Berg et al. | 726/13 |

OTHER PUBLICATIONS

Cullen Linn et al., "Obfuscation of Executable Code to Improve Resistance to Static Disassembly", [Online], ACM 2003, pp. 1-10, [Retrieved from Internet on Dec. 10, 2013], <https://www.cs.arizona.edu/solar/papers/CCS2003.pdf>.*

Shengying Li , "A Survey on Tools for Binary Code Analysis",[Online], 2004, pp. 1-39, [Retrieved from Internet , on Dec. 22, 2011], <http://www.thehackademy.net/madchat/vxdevl/library/A Surveyon Tools for Binary Code Analysis.pdf>.*

Laune C. Harris et al., "Practical Analysis of Stripped Binary Code", [Online], ACM-2005, pp. 63-68, [Retrieved from Internet on Dec. 10, 2013], <http://delivery.acm.org/10.1145/1130000/1127590/p63-harris.pdf>.*

J. Bergeron, "Static Analysis of Binary Code to Isolate Malicious Behaviors", [Online], IEEE 1999, pp. 1-6, [Retrieved from Internet on Dec. 10, 2013], <http://ieeexplore.ieee.org/stamp/stamp.jsp?tp=&arnumber=805197>.*

Christopher Kruegel et al., "Static Disassembly of Obfuscated Binaries", USENIX 2004, pp. 1-26, [Retrieved from Internet on Jun. 13, 2014], <https://www.usenix.org/legacy/events/sec04/tech/full_papers/kruegel/kruegel_html/>.*

Andreas Sbjornsen et al., "Detecting Code Clones in Binary Executables", ACM 2009, pp. 1-11, [Retrived from Internet on Jun. 14, 2014], <http://delivery.acm.org/10.1145/1580000/1572287/p117-saebjoernsen.pdf>.*

Richard Wartell et al., "Securing Untrusted Code via Compiler-Agnostic Binary Rewriting", ACM 2012, pp. 1-10, [Retrieved from Internet on Jun. 13, 2014], <http://utd.edu/~kxh060100/wartell12acsac.pdf>.*

Zheng Wang, "An Implementation of PostMorph", Division of Engineering and Applied Sciences Harvard University, pp. 1-7, [Retrieved from Internet on Jun. 13, 2014], <http://citeseerx.ist.psu.edu/viewdoc/download?doi=10.1.1.55.192&rep=rep1&type=pdf>.*

Vigna, "Static Disassembly and Code Analysis", in Malware Detection, M. Christodorescu, S. Jha, D. Maughan, D. Song, and C. Wang Eds., 2007, pp. 1-25.

Kruegel, et al., "Static Disassembly of Obfuscated Binaries", USENIX Security Symposium, Proceedings of the 13th conference on USENIX Security Symposium—vol. 13, San Diego, CA, Year of Publication: 2004, pp. 18-33.

Vinciguerra, et al., "An Experimentation Framework for Evaluating Disassembly and Decompilation Tools for C++ and Java", Proceedings of the 10th Working Conference on Reverse Engineering, Year of Publication: 2003, pp. 14-23.

Harris, et al., "Practical Analysis of Stripped Binary Code", ACM SIGARCH Computer Architecture News, vol. 33 , Issue 5 (Dec. 2005), Special issue on the 2005 workshop on binary instrumentation and application, pp. 63-68.

Free Software Foundation, Inc., Objdump—GNU Binary Utilities, GNU Manuals Online, <www.gnu.org/software/binutils/manual/html_chapter/binutils_4.html>, Retrieved from the Feb. 5, 2007 Internet Archive Capture at <https://web.archive.org/web/20070205030416/http://www.gnu.org/software/binutils/manual/html_chapter/binutils_4.html>.

Microsoft Corporation, Description of the DUMPBIN Utility, Sep. 1, 2005 [Online at <http://support.microsoft.com/kb/177429>].

Benjamin Schwarz, Saumya Debray, Gregory Andrews, and Matthew Legendre, A Link-Time Optimizer for the Intel IA-32 Architecture, in Proc. 2001 Workshop on Binary Rewriting WBT-2001, (Sep. 2001).

Microsoft Corporation, Debugging Tools for Windows—Overview [Online at <http://www.microsoft.com/whdc/devtools/debugging/default.mspx>, Retrieved from the Oct. 11, 2007 Internet Archive Capture at <https://web.archive.org/web/20071011030649/http://www.microsoft.com/whdc/devtools/debugging/default.mspx>].

S. Nanda, W. Lam, and T.C. Chiueh, BIRD: Binary Interpretation using Runtime Disassembly, 4th Annual International Symposium on Code Generation and Optimization, 2006.

C. Cifuentes, M. Van Emmerik, D. Ung, D. Simon, and T. Waddington, Preliminary Experiences with the Use of the UQBT Binary Translation Framework, In Proc. of Workshop on Binary Translation, Oct. 1999.

C. Cifuentes and K. Gough, Decompilation of Binary Program, In Software Practice & Experience vol. 25, No. 7, pp. 811-829, Jul. 1995.

Hex-Rays, IDA Pro Disassembler, Feb. 17, 2007 [Online at <http://www.datarescue.com/idabase/overview.htm>, Retrieved From the Oct. 10, 2007 Internet Archive Capture at <http://web.archive.org/web/20071010031607/http://www.datarescue.com/idapro/overview.htm>].

Ilfak Guilfanov and Datarescue, Fast Library Identification and Recognition Technology,1997 [Online at <http://www.datarescue.com/idabase/flirt.htm>, Retrieved From the Oct. 11, 2007 Internet Archive Capture at <http://web.archive.org/web/20071011055037/http://www.datarescue.com/idabase/flirt.htm>].

M. Prasad and T.C. Chiueh, A Binary Rewriting Defense against Stack Based Buffer Overflow Attacks, USENIX Annual Technical Conference, 2003.

Intel Corporation, Intel 64 and IA-32 Architectures Software Developer's Manual: vol. 2: Instruction Set Reference, May 2007.

D. Patterson, J. Hennessy, Computer Organization and Design (3rd edition), (Chapter 6), Morgan Kaufmann Publishers, San Francisco, CA, 2007.

Microsoft Corporation, COM (Component Object Model), [Online at <http://msdn2.microsoft.com/en-us/library/aa830217.aspx>, Retrieved from the Jun. 5, 2007 Internet Archive Capture at <https://web.archive.org/web/20110221072555/http://msdn.microsoft.com/en-us/library/community/history/ms680573(v=vs.85).aspx?id=1>].

Free Software Foundation, GCC, Options That Control Optimization, Optimize Options—Using the GNU Compiler Collection (GCC), [Online at <http://gcc.gnu.org/onlinedocs/gcc-4.1.2/gcc/Optimize-Options.html>], 2005.

Microsoft Corporation, Microsoft Portable Executable and Common Object File Format Specification, Revision 8.0—May 16, 2006, [Online at <http://www.microsoft.com/whdc/system/platform/firmware/PECOFF.mspx>].

C. Cifuentes and M. Van Emmerik, Recovery of Jump Table Casse Statements from Binary Code, Science of Computer Programming, vol. 40, No. 2-3, pp. 171.188, Jul. 2001.

Markus F.X.J. Oberhumer, Laszlo Molnar and John F. Reiser, UPX, the Ultimate Packer for eXecutables, Feb. 5, 2000 [Online at <http://upx.sourceforge.net>].

Philippe Biondi and Fabrice Desclaux, Silver Needle in the Skype, BlackHat Europe, Mar. 2-3, 2006, [Online at <http://blackhat.com/presentations/bh-europe-06/bh-eu-06-biondi/bh-eu-06-biondi-up.pdf>].

* cited by examiner

300

00000000

. . .

FFFF0000

320
325
0F0F0111
330
FFFF1111

DISASSEMBLING AN EXECUTABLE BINARY

BACKGROUND

A disassembler is a computer program that translates machine language, e.g. executable binary, into assembly language source code instructions. An executable binary consists of machine instructions of a specific processor or binary pseudocode for a virtual machine. The translated instructions are often formatted for human-readability rather than suitability for input to an assembler, making a disassembler principally a reverse-engineering tool. Disassembly is not an exact science. It is possible for a single program to have two or more distinct, yet accurate, disassemblies, i.e., sets of translated source code instructions.

Typically, the disassembly resembles the original source code from which the binary is created. However, assembly languages permit the use of symbolic constants and comments. As symbolic constants and comments are not necessary to the execution of the binary, an assembler usually removes symbolic constants and comments before creating the binary. As a result, a disassembler operating on a binary created accordingly generates assembler source code instructions lacking these constants and comments. Accordingly, the disassembled output becomes more difficult for a human to interpret than the original annotated source code.

SUMMARY

Described herein are implementations of various technologies for disassembling an executable binary. In one implementation, a plurality of potential address references may be identified based on the binary and a plurality of storage addresses containing the binary. A plurality of assembler source code instructions (instructions) may be generated by disassembling the binary. The binary may be disassembled at one or more sequential addresses starting at each of the plurality of potential address references.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

In general, one or more implementations of various technologies described herein are directed to disassembling an executable binary (binary). The executable binary may be searched for potential address references based on the range of addresses within which the binary is stored and knowledge about how compilers store addresses within the binary. The binary may be disassembled using a recursive traversal algorithm, with the potential address references as a starting point for successive traversals of the binary. The potential address references may then be validated, resulting in the retention or discarding of the assembler instructions generated by the recursive traversal algorithm. Any code sections of the binary (areas of the binary containing executable instructions) not disassembled by the recursive traversal algorithm may be disassembled using a linear sweeping algorithm.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc., that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
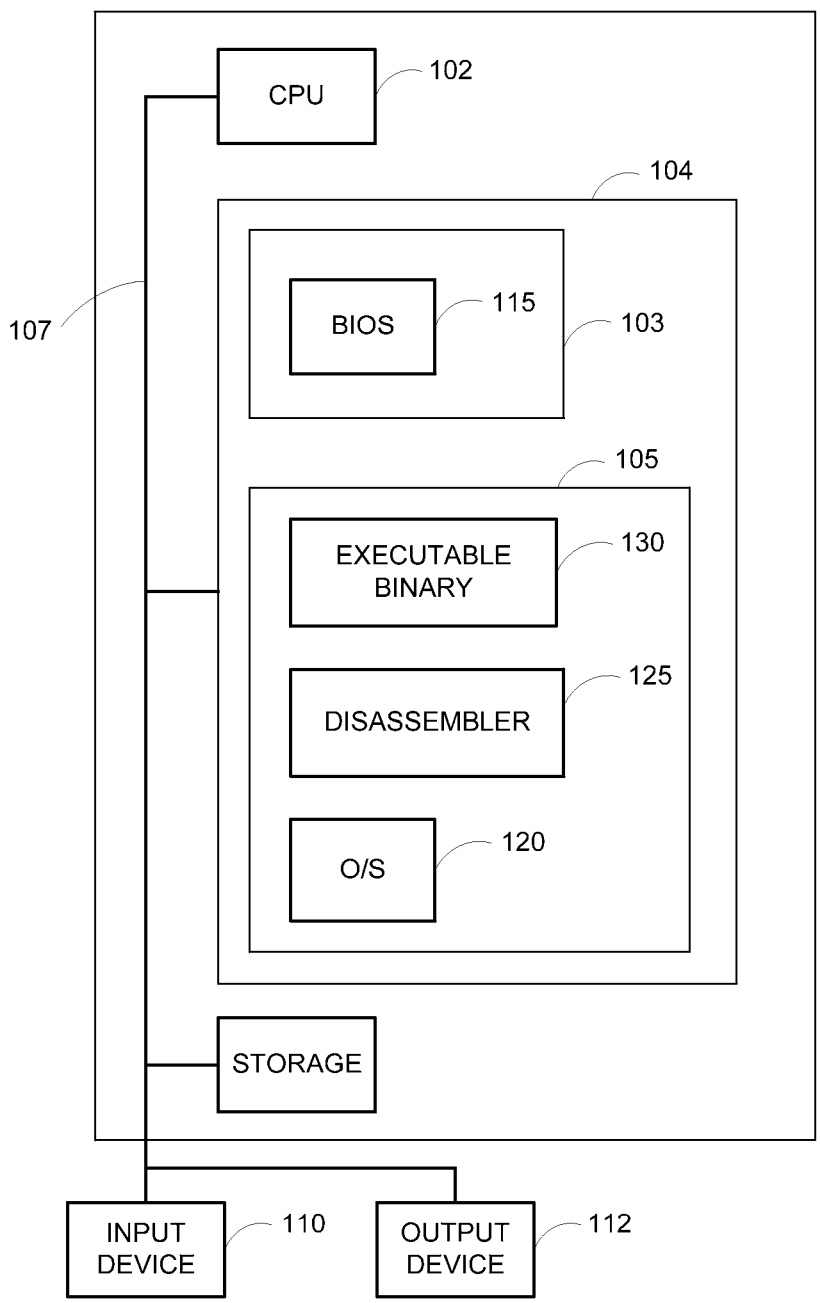
FIG. 1 illustrates a schematic diagram of a computing system in which the various technologies described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 102, a system memory 104 and a system bus 107 that couples various system components including the system memory 104 to the CPU 102. Although only one CPU is illustrated in FIG. 1, it should be understood that in some implementations the computing system 100 may include more than one CPU. The system bus 107 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnect (PCI) bus also known as Mezzanine bus. The system memory 104 may include a read only memory (ROM) 103 and a random access memory (RAM) 105. A basic input/ output system (BIOS) 115, containing the basic routines that help transfer information between elements within the computing system 100, such as during start-up, may be stored in the ROM 103.

The computing system 100 may further include a storage component 106, which may be connected to the bus 107. Examples of storage 106 include a hard disk drive for reading from and writing to a hard disk, a magnetic disk drive for reading from and writing to a removable magnetic disk, and an optical disk drive for reading from and writing to a removable optical disk, such as a CD ROM or other optical media. The storage 106 and associated computer-readable media may provide nonvolatile storage of computer-readable instructions, data structures, program modules and other data for the computing system 100.

It should be appreciated by those skilled in the art that the computing system 100 may also include other types of storage 106 and associated computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored in storage 106, ROM 103 or RAM 105, including an operating system 120, an executable binary 130, and a disassembler program 125. The operating system 120 may be any suitable operating system that may control the operation of a networked personal or server computer, such as Windows® XP, Mac OS® X, Unix-variants (e.g., Linux® and BSD®), and the like. The executable binary 130 may be any computer program capable of being executed by any CPU processing instructions on a computing system with any operating system. The executable binary 130 does not necessarily have to be executable on the CPU 102 and the operating system 120 of the computing system 100. The disassembler program 125 is described in greater detail in the description of FIGS. 2A-B.

A user may enter commands and information into the computing system 100 through an input device 110. Examples of input devices 110 include keyboards, pointing devices, microphones, joysticks, game pads, satellite dishes, scanners, or the like. These and other input devices may be connected to the CPU 102 through the system bus 107. A user may receive information from the computing system 100 via an output device 112. Examples of output devices 112 include displays, speakers, printers, and fax machines.

Figure 2A:
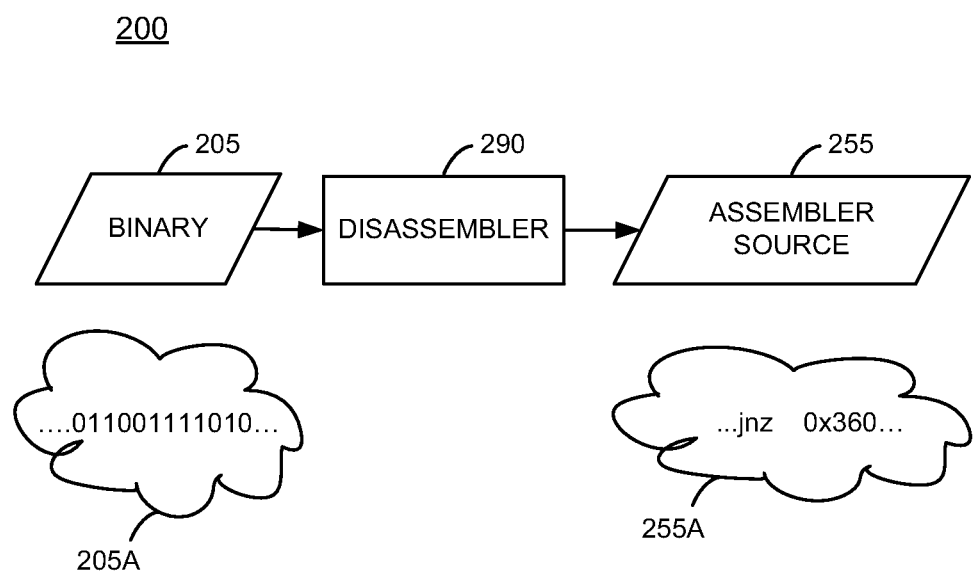
FIG. 2A illustrates a data flow diagram of a method in accordance with one or more implementations of various techniques described herein.

FIG. 2A illustrates a data flow diagram of a method 200 in accordance with one or more implementations of various techniques described herein. The method 200 uses an executable binary (binary) 205 as an input to a disassembler process 290, which is configured to generate an assembler source code 255 representation of the binary 205. Binary 205A is an example of executable binary 205 and assembler source 255A is an example of assembler source code 255. In one implementation, the disassembler process 290 may be implemented as the disassembler program 125 on the computing system 100.

Figure 2B:
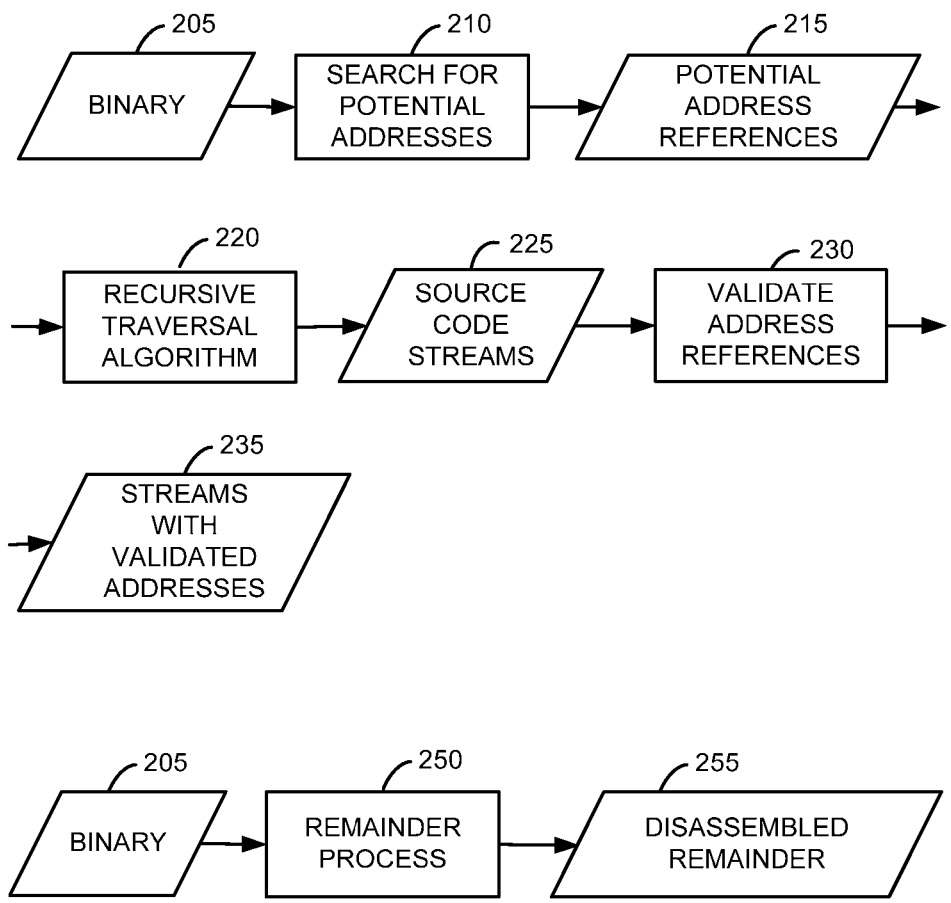
FIG. 2B illustrates a data flow diagram of the disassembler process in accordance with one or more implementations of various techniques described herein.

FIG. 2B illustrates a data flow diagram of the disassembler process 290 in accordance with one or more implementations of various techniques described herein. The disassembler process 290 begins with process 210 which may perform a search for potential addresses within the binary 205. Each of the potential address references 215 represents the potential address of an assembler instruction within the code sections of the binary 205.

Figure 3:
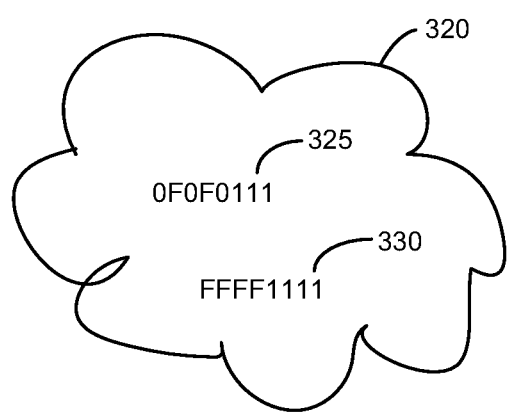
FIG. 3 illustrates an example binary against which the various technologies described herein may be incorporated and practiced.

In one implementation, the search for potential addresses process 210 includes searching the binary contents for values that fall within the range of memory addresses that contain the code sections of the binary 205. FIG. 3 illustrates an example binary 300 against which the various technologies described herein may be incorporated and practiced. As shown, the example binary 300 is stored between starting address, "00000000," and ending address, "FFFF0000." An example snippet of binary source 320 illustrates two internal values 325 and 330. The internal value 325 represents a potential address reference 215 because the value "0F0F0111" falls between "00000000" and "FFFF0000," which are the start and end addresses of the memory containing the binary 305.

The internal value, "FFFF1111", does not represent a potential address reference 215 because "FFFF1111" is greater than the end address of the memory containing the binary 305.

Further, knowledge about the compiler that generates the binary may be used to locate potential address references 215. For example, compilers may create structures in the binary 205 such as jump tables or virtual tables, which contain lists of address references. In one implementation, the search process 210 may identify a jump table data structure within the binary 205, and add the addresses referenced within the jump table to the set of potential address references 215. Of course, those skilled in the art recognize that a number of compiler-generated structures that exist in a binary 205 may contain address references, which may be added to the potential address references 215. Jump tables are used herein merely as one example of such an address-holding structure and their description is not intended to limit the description of implementations of the invention.

The potential address references 215 and the binary 205 may be input to a recursive traversal algorithm 220, which generates assembler source code instructions. For each potential address reference 215, the algorithm 220 generates assembler source code streams 225 based on the contents of the binary 205 at the address referenced. The recursive traversal algorithm 220 is described in more detail in FIG. 4.

Because the address references from which the source code streams 225 are generated are only potential address references, the source code streams 225 may include some invalid streams. Further, the recursive traversal algorithm 220 may generate some redundant streams. Accordingly, the source code streams 225 may be input to a validate address reference process 230, which determines whether each potential address reference is valid, and if not, removes the source code streams generated from the invalid address references. The validate address reference process 230 filters the source code streams 225 down to a smaller set of streams with validated addresses 235, and is described in more detail in FIG. 5.

A remainder process 250 then determines which code regions of the original binary 205 are not disassembled by the recursive traversal algorithm, and uses a linear sweeping algorithm to complete the disassembly. The remainder process 250 is described in more detail in FIG. 6. In one implementation, taken together, the streams 235 and the disassembled remainder code 255 constitute the whole of the assembler source code generated from all of the code sections of the binary 205.

Figure 4:
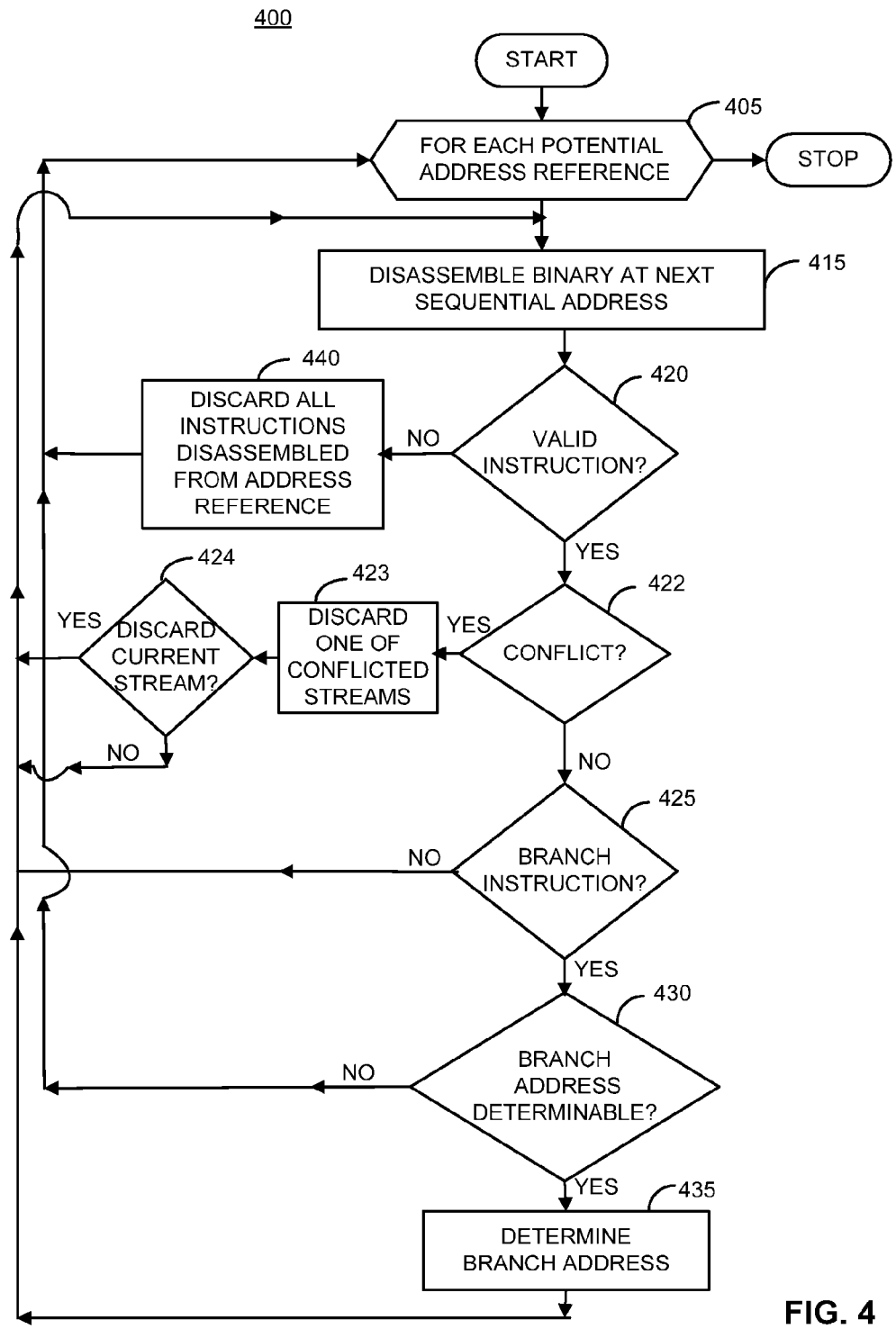
FIG. 4 illustrates a flow chart of a method for disassembling a binary in accordance with one or more implementations of various techniques described herein.

FIG. 4 illustrates a flow chart of a method 400 for disassembling a binary 205 in accordance with one or more implementations of various techniques described herein. In one implementation, the method 400 may be performed by the recursive traversal algorithm process 220. It should be understood that while the operational flow diagram indicates a particular order of execution of the operations, in some implementations, certain portions of the operations might be executed in a different order.

Method 400 begins at step 405. The steps 410-435 may be repeated for each address in the potential address references 215.

At step 415, the disassembler program 125 may disassemble the contents of the binary 205 at the next sequential address. In other words, a line of assembler source code (an instruction), may be generated based on the content of the bytes located at the next sequential address.

The value of the next sequential address may depend on when step 415 is performed. The first time step 415 is performed, the next sequential address may be the address of the potential address reference. On subsequent iterations, the next sequential address may increment to the address following the previously disassembled instruction. In one implementation, the next sequential address may be determined based on an anti-obfuscation method.

Obfuscation is a process of encoding a binary with dummy bytes (obfuscation bytes) to impede disassembly. For example, the next sequential address as calculated without an anti-obfuscation method may in fact point to the obfuscation bytes. In one implementation, the disassembler program 125 identifies obfuscation bytes, and determines the next sequential addresses accordingly.

In one implementation, steps 415-435 are repeated for each of the addresses following the potential address reference. Accordingly, a sequence of assembler instructions (stream) may be generated based on the contents of the binary 205 located in addresses of memory subsequent to the address of the potential address reference.

At step 420, the disassembler program 125 may determine whether the source code generated at step 415 is a valid assembler instruction. If not, at step 440, all the instructions generated from the disassembly, beginning at the address reference, right up to the most recent, may be discarded. Processing may then return to step 405 for the next potential address reference.

If the source code generated at step 415 is a valid instruction, at step 422, the disassembler program 125 may determine whether the source code generated at step 415 creates a conflict with a stream generated for another potential address reference. For example, two source code streams derived from two distinct potential address references may overlap in memory. If so, at step 423, the disassembler program 125 may discard one of the conflicted streams, either the current stream or the previously generated stream. At step 424, the disassembler program 125 may determine which stream was discarded. If the current stream was discarded, processing returns to step 405. Otherwise processing returns to step 415. In one implementation, selecting the stream to discard is based on a confidence code comparison.

For example, the disassembler program 125 may assign confidence codes (major confidence codes) to each of the potential address references. The major confidence code may indicate a level of confidence as to whether a potential address reference is a valid address reference. A valid address reference is an actual address reference in an assembler source code from which the binary is generated. For example, a potential address reference located in a recognizable entry point of the binary 205, i.e., a main or exported entry, may have a high confidence value, a potential address reference located in a jump table may have a medium confidence value, a potential address reference located elsewhere in the binary 205 may have a low confidence value.

By comparing major confidence codes of distinct potential address references, it is possible to resolve conflicts between source code streams generated from each. If the major confidence code of the first is greater than that of the second, the first potential address reference is more likely to be a valid address reference. Accordingly, the source code stream derived from the potential address reference with the lower major confidence code may be discarded, and processing may return to step 405 for the next potential address reference.

Similarly, the disassembler program 125 may assign confidence codes to individual bytes, i.e. minor confidence codes. A minor confidence code may indicate a level of confidence as to whether a byte represents the beginning of a valid instruction. A valid instruction is an actual instruction in an assembler source code from which the binary is generated. In the event that the major confidence codes for two conflicting streams are equal, the minor confidence codes of the first instruction byte of each may be compared. It is possible that both the major and minor confidence codes of two conflicting streams may be equal. In such a case, other criteria may be used to resolve the conflict. In one implementation, the number of branch instructions in the associated generated instructions may be compared. In such a scenario, the stream with the lesser number of branch instructions in the two conflicting streams may be discarded. When the number of branch instructions in two conflicting streams is the same, the total number of generated instructions in two conflicting streams may be compared. In such a case, the stream with lesser number of total generated instructions may be discarded.

If the source code generated at step 415 does not create a conflict with another stream, at step 425, the disassembler program 125 may determine whether the source code generated is a branch instruction. If not, processing may return to step 415 for the next sequential address.

If the source code generated at step 415 is a branch instruction, the disassembler program 125 may determine whether the branch address is determinable at step 430. In other words, a determination may be as to whether the destination to which the branch instruction directs program flow is determinable. If not, processing may return to step 405 for the next potential address reference.

In one implementation, if the branch address is not determinable, the disassembler program 125 may perform a virtual execution of the instructions generated thus far in order to calculate the branch address.

If the branch address is determinable, at step 435, the branch address may be determined. Processing may then return to step 415 using the branch address as the next sequential address.

Figure 5:
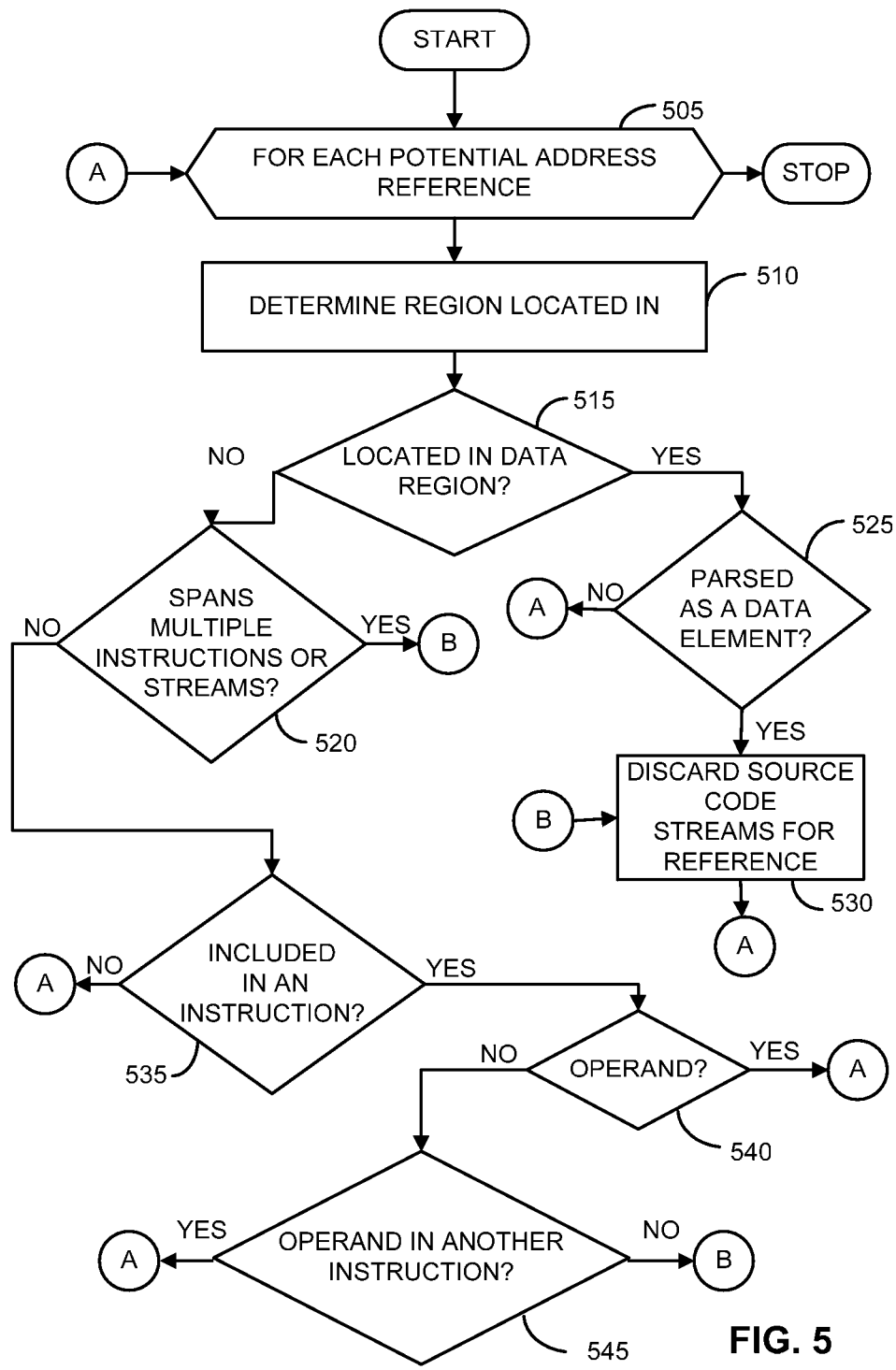
FIG. 5 illustrates a flow chart of a method for validating potential address references in accordance with one or more implementations of various techniques described herein may be incorporated and practiced.

FIG. 5 illustrates a flow chart of a method 500 for validating potential address references 215 in accordance with one or more implementations of various techniques described herein may be incorporated and practiced. The potential address references 215 do not include addresses invalidated when processing the recursive traversal algorithm 220. In one implementation, the method 500 may be performed by the validate address references process 230. Validating address references in method 500 takes into consideration the consistency of the generated instructions, i.e., source code stream 225, with the potential address references 215 based on the known structures of a compiled binary for a specific processor or binary pseudocode for a virtual machine. One or more implementations of various techniques described herein exploit such known structures and therefore may be incorporated and practiced to check the consistency for validating potential address references.

Further, by analyzing certain characteristics (described below) about where an address reference is located, it is possible to determine whether the address reference is valid. A valid address reference is an actual address reference in an assembler source from which the binary is generated. Accordingly, source code streams generated for a particular reference may be retained or discarded. It should be understood that while the operational flow diagram indicates a particular order of execution of the operations, in some implementations, certain portions of the operations might be executed in a different order.

Method 500 begins with step 505. Steps 505-545 may be repeated for each address reference in the potential address references 215.

At step 510, the disassembler program 125 may determine the region of the binary 205 in which the address reference is located. The binary 205 contains data regions and code regions. Data regions contain data. Code regions contain executable instructions. In one implementation, determining the region may be based on the source code streams 225 generated by the recursive traversal algorithm 220. If the address reference is located in one of the source code streams 225, the region may be the code region. Otherwise, the region may be a data region of the binary 205.

At step 515, the disassembler program 125 may determine whether the address reference is located in the data region. If so, at step 525, the disassembler program 125 may determine whether the address reference is parsed as a data element. If so, the address reference is likely not a valid address. Accordingly, at step 530, the source code streams generated for the address reference may be discarded, and processing may return to step 505 for the next address reference.

If the address reference is not parsed as a data element, the address reference may be a valid address. Accordingly, processing may return to step 505 for the next address reference.

If the address reference is not located in one of the data regions, at step 520, the disassembler program 125 may determine whether the address reference spans multiples. In one implementation, spanning multiples indicates that the location in the binary where the address reference is located spans the address space of more than one instruction, or more than one source code stream. Accordingly, if the address reference spans multiples, at step 530, the source code streams for the address reference are discarded, and processing may return to step 505 for the next address reference.

If the address reference does not span multiples, at step 535, the disassembler program 125 may determine whether the address reference is included in an instruction. If not, processing may return to step 505 for the next address reference.

If so, at step 540, the disassembler program 125 may determine whether the address reference is an operand of the instruction. If so, the address reference is considered valid, and processing may return to step 505 for the next address reference.

If the address reference is found in an instruction (determined at step 535), yet the address reference is not an operand (determined at step 540), at step 545, the disassembler program may determine whether the address reference appears in another instruction.

If the address reference does not appear as an operand in another instruction, the source code stream is discarded at step 530. Otherwise, the source code stream is maintained and processing may return to step 505 for the next potential address reference.

Figure 6:
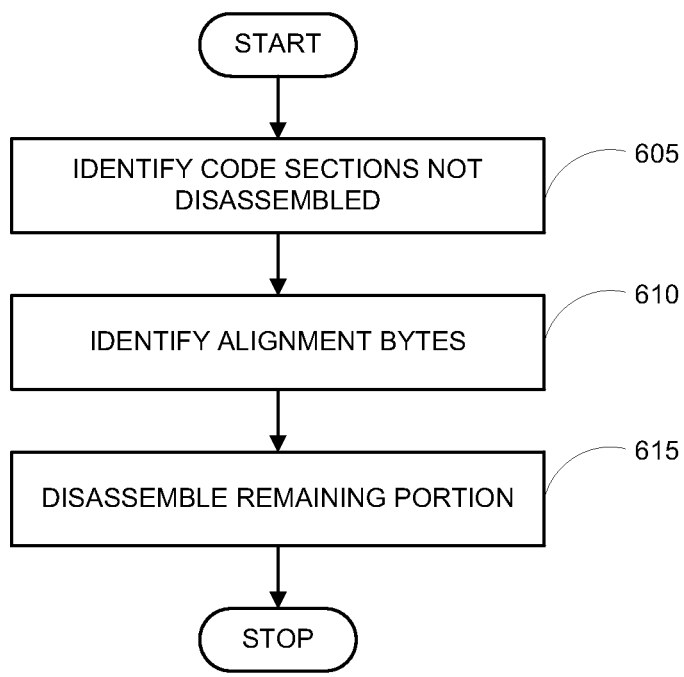
FIG. 6 illustrates a flow chart of a method for disassembling remaining code sections in accordance with one or more implementations of various techniques described herein.

FIG. 6 illustrates a flow chart of a method 600 for disassembling remaining code sections in accordance with one or more implementations of various techniques described herein. In one implementation, the method 600 may be performed by the remainder process 250.

At step 605, the disassembler program 125 may identify code sections of the binary 205 that are not yet disassembled. It should be noted that compilers typically place gap-filling bytes between functions in the binary 205 to make the starting addresses of functions align with specific boundaries, e.g. eight or sixteen byte addresses). At step 610, these alignment bytes, along with padding bytes (typically byte sequences shorter than 10 bytes), may be identified in order to prevent their disassembly.

At step 615, the remaining code sections identified at step 605 may be disassembled using a linear sweeping algorithm. The linear sweeping algorithm interprets the remaining code as instructions, and accordingly, generates assembler source code from the remaining code sections of the binary 205.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by at least one computer processing unit for disassembling an executable binary, the method comprising:

identifying a plurality of potential address references included in the executable binary, wherein the identifying includes excluding at least some values included in the executable binary that do not represent potential addresses in the executable binary; and generating a plurality of assembler source code instructions by disassembling the executable binary at one or more sequential addresses starting at individual potential address references, wherein the disassembling comprises:

assigning confidence codes to the individual potential address references, the confidence codes reflecting relative confidence that the individual potential address references are valid address references;

comparing the confidence codes to resolve a conflict between two different source code streams that overlap in memory, wherein the two different source code streams are generated from two distinct potential address references from the plurality of potential address references; and discarding one of the two different source code streams that overlap in memory based on the confidence codes.

2. The method of claim 1, wherein the executable binary is disassembled using a recursive traversal algorithm.

3. The method of claim 1, further comprising:
associating the individual potential address references with one or more of the plurality of assembler source code instructions.

4. The method of claim 3, further comprising:
determining whether the individual potential address references are valid based on locations of code sections, data sections, or combinations thereof.

5. The method of claim 3, further comprising:
identifying one of the plurality of potential address references in an address-holding structure within the executable binary, or an entry point location in the executable binary.

6. The method of claim 5, wherein the address-holding structure is a jump table or a virtual table.

7. The method of claim 3, further comprising determining that a first individual potential address reference is invalid when bytes referred to by the first individual potential address reference include a pattern of a valid string.

8. The method of claim 3, further comprising determining that a first individual potential address reference is invalid when bytes following a last instruction of the plurality of assembler source code instructions associated with the first individual potential address reference do not include a valid instruction.

9. The method of claim 1, further comprising:
validating the plurality of potential address references based on consistency of the plurality of assembler source code instructions; and
discarding invalid potential address references and source code instructions from the plurality of assembler source code instructions that are associated with the invalid potential address references.

10. The method of claim 9, wherein the validating includes determining whether a first one of the potential address references is valid based on whether the first potential address reference is an operand in one of the plurality of assembler source code instructions that is associated with the first potential address reference.

11. The method of claim 1, wherein the generating comprises:
virtually executing at least one of the plurality of assembler source code instructions.

12. The method of claim 1, further comprising:
assigning additional confidence codes to bytes of the two different source code streams; and
comparing the additional confidence codes to resolve the conflict,
wherein the discarding is based on both the confidence codes and the additional confidence codes.

13. A computer-readable memory device, optical storage device, or magnetic storage device having stored thereon computer-executable instructions which, when executed by a computer, cause the computer to perform acts comprising:
identifying a plurality of potential address references included in an executable binary, wherein the identifying includes excluding at least some values included in the executable binary that do not represent potential addresses in the executable binary; and
generating a plurality of assembler source code instructions by disassembling the executable binary based on the plurality of potential address references, wherein the disassembling comprises:
assigning confidence codes to individual potential address references, the confidence codes reflecting relative confidence that the individual potential address references are valid address references;
comparing the confidence codes to resolve a conflict between two different source code streams that overlap in memory, wherein the two different source code streams are generated from two distinct potential address references from the plurality of potential address references; and
discarding one of the two different source code streams that overlap in memory based on the confidence codes.

14. The computer-readable memory device or storage device of claim 13, the acts further comprising:
virtually executing a first one of the plurality of assembler source code instructions to calculate a branch address.

15. A computer system, comprising:
at least one processing unit; and
a memory comprising program instructions which, when executed by the at least one processing unit, cause the at least one processing unit to:
identify a plurality of potential address references in an executable binary, the plurality of potential address references excluding at least some values included in the executable binary that do not represent potential addresses in the executable binary; and
generate a plurality of assembler source code instructions by disassembling the executable binary based on the plurality of potential address references;
wherein, to disassemble the executable binary, the program instructions further cause the at least one processing unit to:
assign major confidence codes to individual potential address references, the major confidence codes reflecting relative confidence that the individual potential address references are valid address references;
compare the major confidence codes of two different source code streams that overlap in memory to resolve a conflict between the two different source code streams, wherein the two different source code streams are generated from two distinct potential address references from the plurality of potential address references; and
discard one of the two different source code streams that overlap in memory based on the major confidence codes.

16. The system according to claim 15, wherein the instructions are further configured to cause the at least one processing unit to:
assign minor confidence codes to bytes of the two different source code streams.

17. The system according to claim 16, wherein the minor confidence codes indicate levels of confidence as to whether the bytes represent beginnings of actual instructions.

18. The system according to claim 16, wherein the instructions are further configured to cause the at least one processing unit to:
when the major confidence codes for the two different source code streams are equal, compare the minor confidence codes of first instruction bytes of the two different source code streams to resolve the conflict.

19. The system according to claim 18, wherein the instructions are further configured to cause the at least one processing unit to:
   in an instance when the major confidence codes for the two different source code streams are identical and the minor confidence codes of the first instruction bytes of the two different source code streams are also identical, compare a number of branch instructions in the two different source code streams to resolve the conflict.

20. The system according to claim 18, wherein the instructions are further configured to cause the at least one processing unit to:
   in an instance when the major confidence codes for the two different source code streams are identical and the minor confidence codes of the first instruction bytes of the two different source code streams are also identical, compare a total number of assembler source code instructions in the two different source code streams to resolve the conflict.

* * * * *